Figure 1:
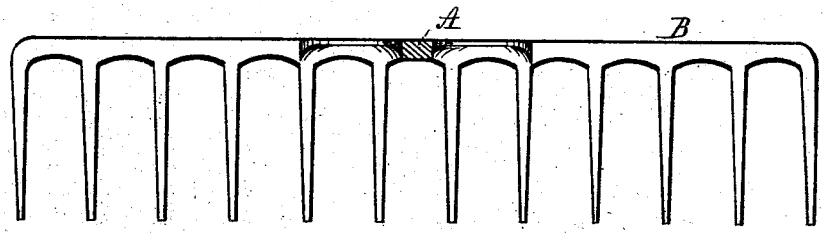

(No Model.)

C. W. KNAPP.
RAKE.

No. 272,268. Patented Feb. 13, 1883.

Witnesses.

Inventor:
C. W. Knapp

UNITED STATES PATENT OFFICE.

CAREY W. KNAPP, OF GENEVA, OHIO.

RAKE.

SPECIFICATION forming part of Letters Patent No. 272,268, dated February 13, 1883.

Application filed November 22, 1882. (No model.)

*To all whom it may concern:*

Be it known that I, CAREY W. KNAPP, of Geneva, in the county of Ashtabula and State of Ohio, have invented a certain new and Improved Rake; and I do hereby declare that the following is a full, clear, and complete description thereof.

The object of this improvement in garden-rakes is to strengthen the connection of the shank of the rake with the head thereof by means of a re-enforcing plate or web extending from each side of the base of the shank along the head of the rake, and forming an integral part of the implement, by which means the rake can be more perfectly made, substantially as described in the following specification, and shown in the drawings making a part of the same, in which drawings—

Figure 2:
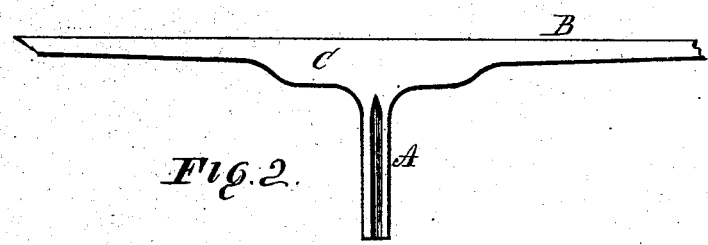

Figure 1 represents the shank side of a rake; Fig. 2, a top view of the rake detached from the handle.

Like letters of reference refer to like parts in the several views.

The above-said rake is, as braced rakes are usually, made of malleable cast metal. The braced rake-shank consists of a pair of braces extending back from the head of the rake and converging until they meet and unite. From said point of union extends the shank of the implement, forming with the braces and head one entire piece. These rakes are necessarily cast teeth downward, in consequence of which the metal does not always fill the mold of the teeth, the matrix being so small and deep (the size and length of the teeth) the metal fails to reach the bottom thereof. Hence it frequently occurs that some of the teeth of the rake are shorter than the others, and when they are all of an equal length the ends of some of the teeth are often imperfect, caused by the air and gas in the matrix, thus causing no little loss in the rake-castings. Also, the shank of the rake, for not being connected directly to the head of the implement, but extending from the braces, as aforesaid, is liable to break off from the braces or the braces to break away from the head, thereby ruining the rake. To avoid these troubles and defects in the structure and casting of the ordinary cast-metal rakes, I connect the shank A of the rake directly to the head B, and re-enforce its connection therewith by means of the plate or web C, forming an integral part of the head and shank, which extends outward from either side thereof in a broad flat plate, as seen in Fig. 2. Said plate or web forms a strong support for the shank in its connection with the head, and is not liable to break, as are the slender braces of the ordinary cast-metal rake. In substituting the re-enforcing plate or web for the braces, as above said, I am enabled to mold the rake with the shank downward, as seen in Fig. 2, so that the teeth of the implement will be horizontal in the flask, instead of downward in the usual way. Hence the metal can flow readily into the matrix of the teeth and fill them, making full, solid, perfect teeth from the head to the point.

What I claim as my invention, and desire to secure by Letters Patent, is—

In garden-rakes, the head B, shank A, and re-enforcing plate or web C, cast integral therewith, substantially as herein described, for the purpose specified.

In testimony whereof I affix my signature in presence of two witnesses.

CAREY W. KNAPP.

Witnesses:
HENRY MEANS,
CHAS. S. MALTBIE.